(12) United States Patent
Zhang et al.

(10) Patent No.: US 11,080,049 B2
(45) Date of Patent: *Aug. 3, 2021

(54) APPARATUS AND METHODS FOR MATRIX MULTIPLICATION

(71) Applicant: CAMBRICON TECHNOLOGIES CORPORATION LIMITED, Beijing (CN)

(72) Inventors: Xiao Zhang, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,688

(22) Filed: Oct. 17, 2019

(65) Prior Publication Data

US 2020/0050453 A1    Feb. 13, 2020

Related U.S. Application Data

(63) Continuation of application No. 16/171,291, filed on Oct. 25, 2018, now Pat. No. 10,592,241, which is a
(Continued)

(30) Foreign Application Priority Data

Apr. 26, 2016    (CN) .......................... 201610266627.0

(51) Int. Cl.
*G06F 9/302*    (2018.01)
*G06F 17/16*    (2006.01)
(Continued)

(52) U.S. Cl.
CPC ........ *G06F 9/30036* (2013.01); *G06F 9/3836* (2013.01); *G06F 17/16* (2013.01);
(Continued)

(58) Field of Classification Search
CPC .. G06F 9/30036; G06F 9/3836; G06F 9/3001; G06F 9/30032; G06F 9/355;
(Continued)

(56) References Cited

U.S. PATENT DOCUMENTS

| | | | |
|---|---|---|---|
| 10,592,241 B2 * | 3/2020 | Zhang | G06F 9/3836 |
| 2005/0055534 A1 * | 3/2005 | Moyer | G06F 9/30043 712/4 |
| 2011/0055517 A1 | 3/2011 | Eichenberger et al. | |
| 2012/0113133 A1 * | 5/2012 | Shpigelblat | G06F 17/16 345/619 |
| 2017/0060811 A1 * | 3/2017 | Yang | G06F 17/16 |
| 2017/0277567 A1 * | 9/2017 | Lai | G06F 9/3851 |

FOREIGN PATENT DOCUMENTS

CN    1584824 A    2/2005

OTHER PUBLICATIONS

Matrix Multiplication, Wikipedia, 2020 (Year: 2020).*
(Continued)

*Primary Examiner* — Daniel H Pan
(74) *Attorney, Agent, or Firm* — Getech Law LLC; Jun Ye (57) ABSTRACT

Aspects for matrix multiplication in neural network are described herein. The aspects may include a controller unit configured to receive a matrix-multiply-matrix (MM) instruction that includes a first starting address of a first matrix, a first size of the first matrix, a second starting address of a second matrix, and a second size of the second matrix; multiple computation modules configured to respectively multiply, in response to the MM instruction, row vectors of the first matrix with column vectors of the second matrix to generate one or more result elements; and an interconnection unit configured to combine the result elements to generate one or more row vectors of a result matrix.

16 Claims, 6 Drawing Sheets

Related U.S. Application Data continuation-in-part of application No. PCT/CN2016/081067, filed on May 5, 2016.

(51) Int. Cl.
| | |
|---|---|
| *G06N 3/04* | (2006.01) |
| *G06F 9/30* | (2018.01) |
| *G06N 3/08* | (2006.01) |
| *G06F 9/38* | (2018.01) |
| *G06F 7/78* | (2006.01) |
| *G06F 15/80* | (2006.01) |
| *G06F 9/355* | (2018.01) |

(52) U.S. Cl.
CPC .............. *G06N 3/08* (2013.01); *G06F 7/78* (2013.01); *G06F 9/3001* (2013.01); *G06F 9/30032* (2013.01); *G06F 9/355* (2013.01); *G06F 9/3557* (2013.01); *G06F 9/3877* (2013.01); *G06F 15/8053* (2013.01); *G06N 3/0454* (2013.01)

(58) Field of Classification Search
CPC ...... G06F 9/3557; G06F 9/3877; G06F 17/16; G06F 15/8053; G06F 7/78; G06N 3/08; G06N 3/0454
USPC ...... 712/5, 7, 9, 31, 221–225; 708/490, 501, 708/514, 520, 523, 524
See application file for complete search history.

(56) References Cited

OTHER PUBLICATIONS

CN 201811233425.1, Official Action dated Mar. 11, 2020, 8 pages.
Chou et al.; "VEGAS: Soft Vector Processor with Scratchpad Memory"; FPGA' 11 Proceedings of the 19th ACM/SIGDA International symposium on Field programmable gate arrays, Feb. 27, 2011; 10 pages.
EP 16899900.1—European Search Report, dated Jul. 3, 2020, 5 pages.
Mostafa I. Soliman, "Mat-Core: A Matrix Core Extension for General-Purpose Processors", Computer & Control Section, Electrical Engineering Department, Faculty of Engineering, South Valley University, Aswan, Egypt, 7 pages.
Shaoli Liu, et al., "Cambricon: An Instruction Set Architecture for Neural Networks", 2016 ACM/IEEE 43rd Annual International Symposium on Computer Architecture, 13 pages.
EP 16899900.1—Communication pursuant to Article 94(3) EPC, dated Sep. 4, 2020, 5 pages.
EP 16899900.1—Response to Communication pursuant to Article 94(3) EPC, filed Dec. 10, 2020, 29 pages.
CN 201610266627.0—First Office Action, dated Apr. 22, 2019, 10 pages. (no English translation).
CN 201610266627.0—Second Office Action, dated Mar. 11, 2020, 13 pages. (no English translation).
PCT/CN2016/081067—International Search Report, dated Jan. 26, 2017, 15 pages. (no English translation).

\* cited by examiner

APPARATUS AND METHODS FOR MATRIX MULTIPLICATION

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. Two main MNN computing processes are forward propagation and backpropagation. The output data of the forward propagation process may be shown as y=f (wx+b), in which w is the weight matrix that includes multiple weight values, x is the input data stored in a form of matrix, b is a bias value, and f( ) is an activation function. In the forward propagation process, the multiplication of the weight matrix w and the input data matrix may cause high complexity than adding a bias value and perform the activation function.

A known method to perform the matrix multiplication of a multilayer artificial neural network is to use a general-purpose processor. Such a method uses a general-purpose register file and a general-purpose functional unit to execute general-purpose instructions to support algorithms in MNNs. However, one of the defects of the method is low operational performance of a single general-purpose processor which cannot meet performance requirements for usual multilayer neural network operations. When multiple general-purpose processors execute concurrently, the intercommunication among them also becomes a performance bottleneck.

Another known method to perform the matrix multiplication of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for matrix multiplication in a neural network. The example apparatus may include a controller unit configured to receive a matrix-multiply-matrix (MM) instruction that includes a first starting address of a first matrix, a first size of the first matrix, a second starting address of a second matrix, and a second size of the second matrix; multiple computation modules configured to receive the first matrix based on the first starting address and the first size of the first matrix, receive the second matrix based on the second starting address and the second size of the second matrix, respectively multiply, in response to the MM instruction, row vectors of the first matrix with column vectors of the second matrix to generate one or more result elements, and an interconnection unit configured to combine the result elements to generate one or more row vectors of a result matrix, wherein at least one of the multiple computation modules is configured to combine the row vectors to generate the result matrix.

Another example apparatus for matrix-scalar multiplication in a neural network may include a direct memory access unit configured to receive a matrix and a scalar from a storage device. In addition, the example apparatus may include a master computation module that further includes a master multiplier configured to multiply each of one or more elements of the matrix with the scalar to generate an updated element, and a merging unit configured to merge the one or more updated elements to generate a result matrix.

An example method for matrix multiplication in a neural network may include receiving, by a master computation module, a first matrix from a storage device; transmitting, by the master computation module, a row vector of the first matrix to one or more slave computation modules; storing, by the one or more slave computation modules, a column vector of a second matrix; multiplying, by the one or more slave computation modules, the row vector of the first matrix with the stored column vector of the second matrix to generate a result element; combining, by an interconnection unit, the one or more result elements generated respectively by the one or more slave computation modules to generate a row vector of a result matrix; and transmitting, by the interconnection unit, the row vector of the result matrix to the master computation module.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Matrix multiplication between two matrices in a neural network may presented as follows: R=A×B, in which A represents a first matrix, B represents a second matrix, and R represents a result matrix. In general, the first matrix A may be structured to include m rows and n columns and may be referred to as an m×n matrix. The second matrix B may be structured to include n rows and p columns and may be referred to as an n×p matrix. The first matrix A may be described as follows:

$$\begin{bmatrix} a_{11} & a_{12} & \ldots & a_{1i} & \ldots & a_{1n} \\ a_{21} & a_{22} & \ldots & a_{2i} & \ldots & a_{2n} \\ \vdots & \vdots & \vdots & \vdots & \ddots & \vdots \\ a_{j1} & a_{j2} & \ldots & a_{ji} & \ldots & a_{jn} \\ \vdots & \vdots & \vdots & \vdots & \vdots & \vdots \\ a_{m1} & a_{m2} & \ldots & a_{mi} & \ldots & a_{mn} \end{bmatrix}$$

and the second matrix B may be described as follows:

$$\begin{bmatrix} b_{11} & b_{12} & \ldots & b_{1i} & \ldots & b_{1p} \\ b_{21} & b_{22} & \ldots & b_{2i} & \ldots & b_{2p} \\ \vdots & \vdots & \vdots & \vdots & \ddots & \vdots \\ b_{j1} & b_{j2} & \ldots & b_{ji} & \ldots & b_{jp} \\ \vdots & \vdots & \vdots & \vdots & \vdots & \vdots \\ b_{n1} & b_{n2} & \ldots & b_{ni} & \ldots & b_{np} \end{bmatrix}.$$

Figure 1:
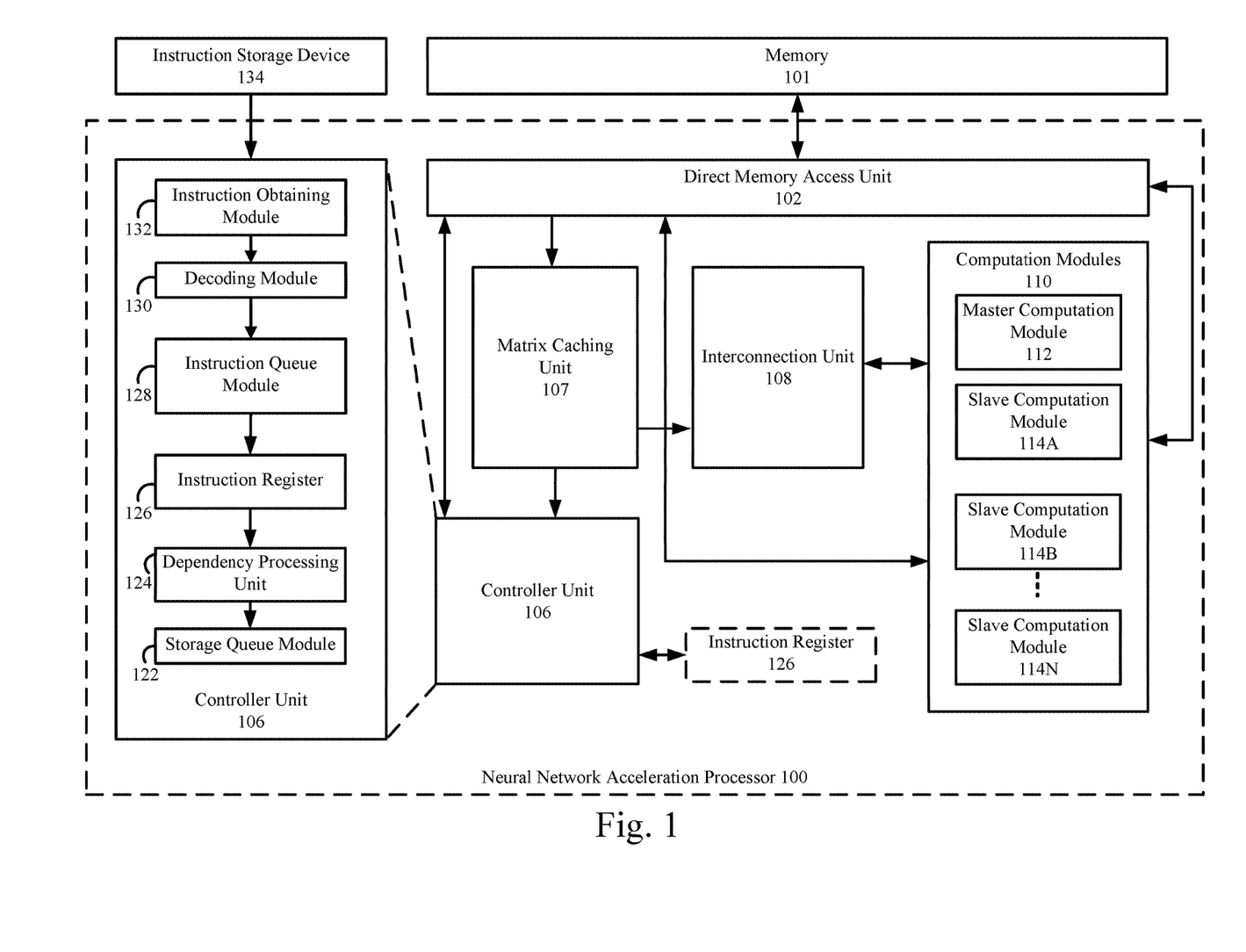
FIG. 1 illustrates a block diagram of an example neural network acceleration processor by which matrix multiplication may be implemented in a neural network.

FIG. 1 illustrates a block diagram of an example neural network acceleration processor 100 by which matrix multiplication may be implemented in a neural network. As depicted, the example neural network acceleration processor 100 may include a controller unit 106, a direct memory access unit 102, an interconnection unit 108, a plurality of computation modules 110 that may include a master computation module 112 and one or more slave computation modules 114A-114N (collectively referred to as slave computation modules 114). Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a matrix multiplication instruction may originate from an instruction storage device 134 to the controller unit 106. An instruction obtaining module 132 may be configured to obtain a matrix multiplication instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a matrix-multiply-matrix (MM) instruction, for example, may include a starting address of a first matrix, a size of the first matrix, a starting address of a second matrix, a size of the second matrix, and an address for an output matrix. As depicted, in some examples, the instruction register 126 may be implemented by one or more registers external to the controller unit 106.

The instruction register 126 may be further configured to store scalar values for the instruction. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode the instruction into micro-instructions for controlling operations of other modules including the direct memory access unit 102, the master computation module 112, the slave computation modules 114, etc.

The direct memory access unit 102 may be configured to access an external address range (e.g., in an external storage device such as a memory 101) and directly read or write matrix data into respective caching units in the multiple computation modules 110 in accordance with the received instruction.

In some example, an IO instruction may instruct the direct memory access unit 102 to read the first matrix A and the second matrix B from the memory 101. The IO instruction may further instruct the direct memory access unit 102 to store the result matrix R back into the external space after completion of computation.

The direct memory access unit 102 may be configured to transmit data of the first matrix A and the second matrix B to the master computation module 112. The data of the first matrix A and the second matrix B may also be stored in a matrix caching unit 107. The master computation module 112 may be further configured to respectively transmit column vectors of the second matrix B to the slave computation modules 114. In other words, each of the slave computation modules 114 may be configured to respectively store a column vector of the second matrix B.

The master computation module 112 may be further configured to sequentially transmit each row vector of the first matrix A to the slave computation modules 114. The slave computation modules 114 may independently multiply the row vector of the first matrix A with the stored column vectors of the second matrix B. Taking a slave computation module 114N as an example, the slave computation module 114N may be configured to multiply the received row vector of the first matrix A with a column vector (e.g., the $n^{th}$ column vector) of the second matrix stored in the slave computation module 114N to generate a result element. Result elements from the multiple slave computation modules 114 may be transmitted to the interconnection unit 108. The interconnection unit 108 may be configured to combine the result elements into a row vector and transmit the row vector to the master computation module 112. Upon receiving the row vector from the interconnection unit 108, the master computation module 112 may transmit a next row vector of the first matrix A to the slave computation modules 114 for performing a similar multiplication operation.

When all row vectors of the first matrix A have been transmitted to and processed by the slave computation modules 114, the master computation module 112 may be configured to merge the row vectors received from the interconnection unit 108 into a result matrix.

Figure 2:
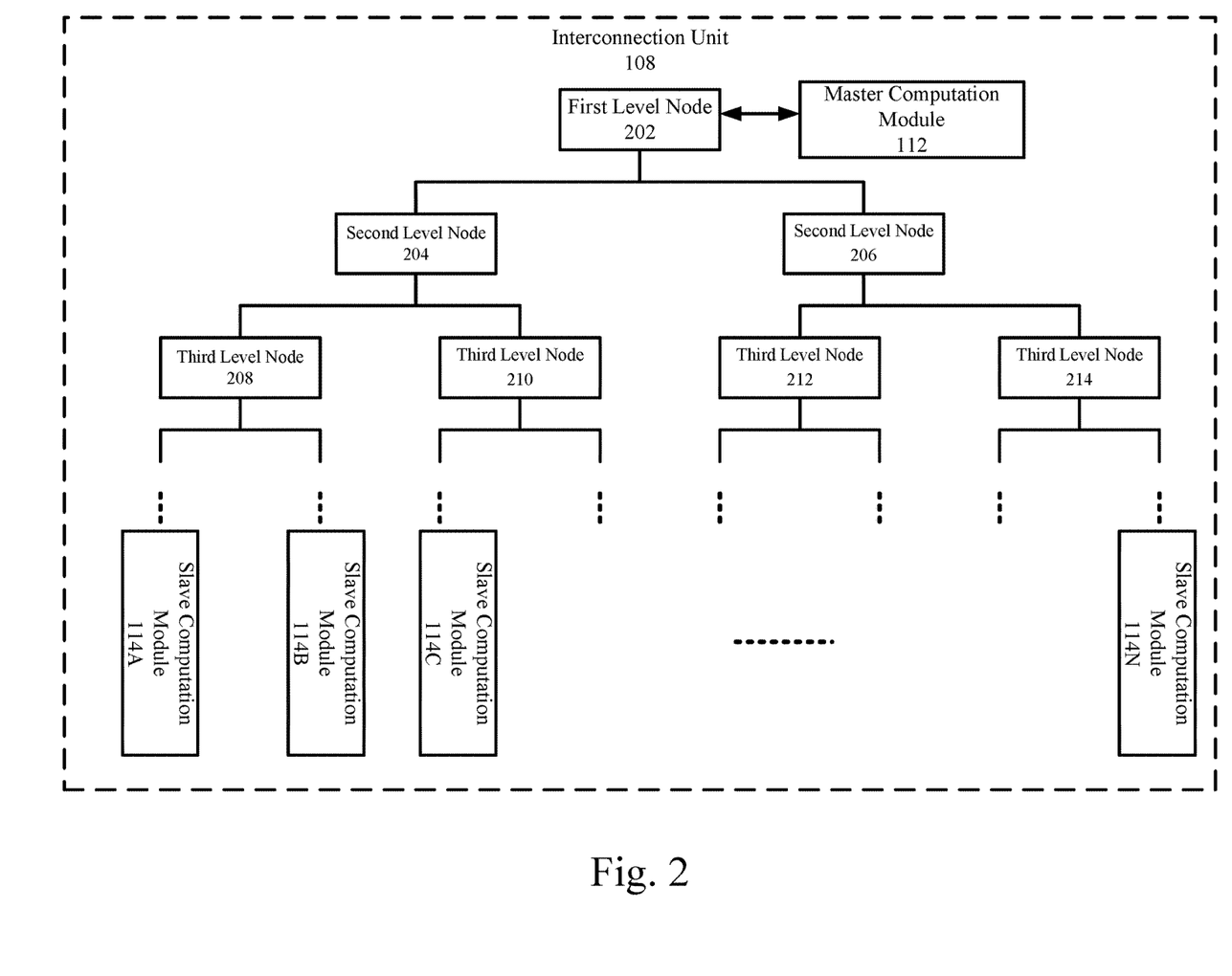
FIG. 2 is a block diagram illustrating an example interconnection unit by which matrix multiplication may be implemented in a neural network.

FIG. 2 is a block diagram illustrating an example interconnection unit by which matrix multiplication may be implemented in a neural network.

As depicted, the interconnection unit 108 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. In some other examples, the received data (e.g., a and b) from the two nodes at the lower level may be added by a node at a higher level.

For example, each of the slave computation modules 114 may be connected to the nodes at the lowest level of the binary tree. The result elements calculated by the slave computation modules 114 may be combined into multiple 2-dimensional vectors at the second lowest level. The result elements may be further combined into a p-dimensional vector, i.e., a row vector of the result matrix, at the first level node 202.

Figure 3:
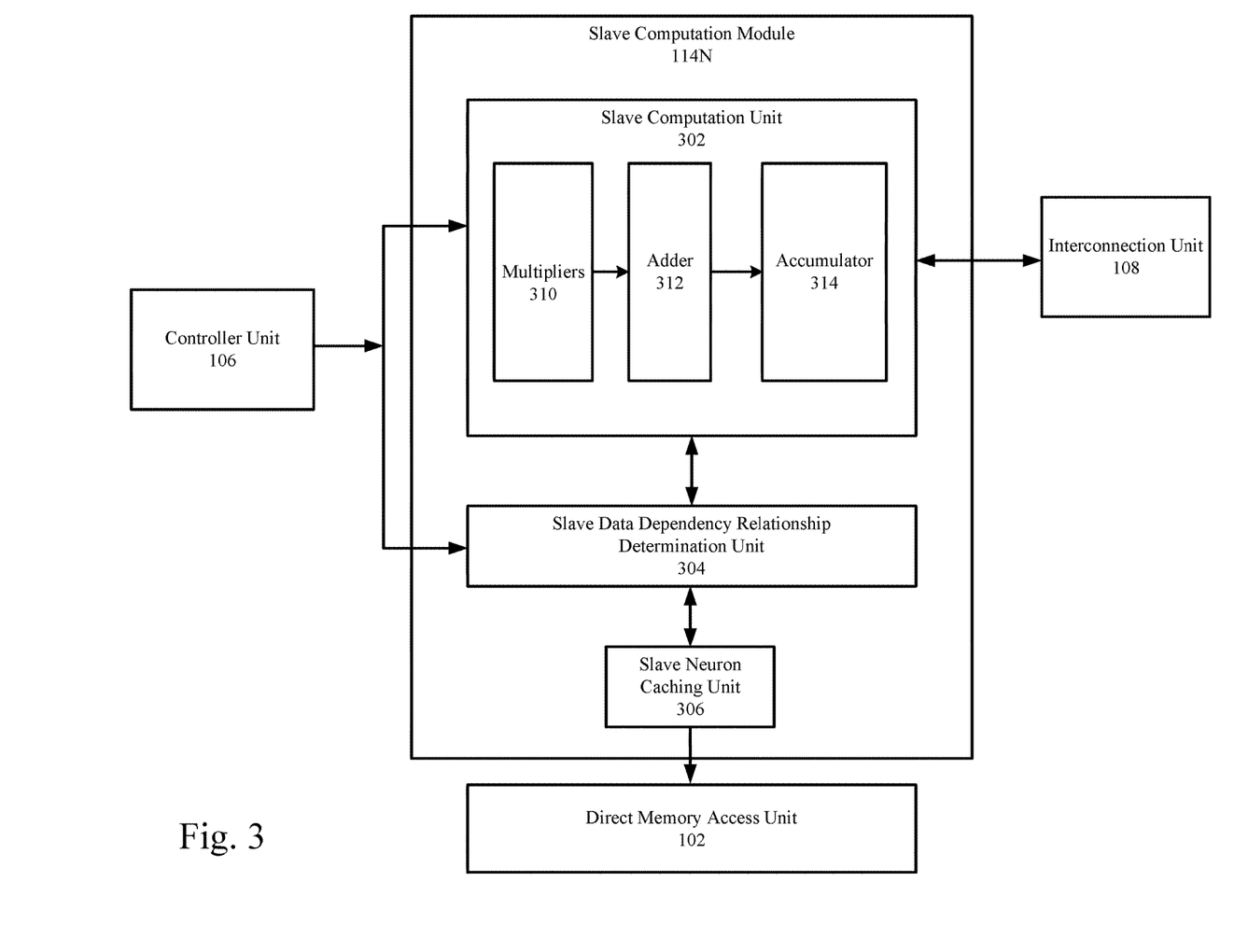
FIG. 3 is a block diagram illustrating an example slave computation module by which matrix multiplication may be implemented in a neural network.

FIG. 3 is a block diagram illustrating an example slave computation module 114N by which matrix multiplication may be implemented in a neural network.

As shown in FIG. 3, the slave computation module 114N may include a slave computation unit 302, a slave data dependency relationship determination unit 304, and a slave neuron caching unit 306. Hereinafter, a caching unit (e.g., a master neuron caching unit 406, a slave neuron caching unit 306, etc.) may refer to an on-chip caching unit integrated in the neural network acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory.

The slave data dependency relationship determination unit 304 may be configured to perform data access operations (e.g., reading or writing operations) on the caching units including the slave neuron caching unit 306 during the computation process. The slave data dependency relationship determination unit 304 may be configured to prevent conflicts in reading and writing of the data in the caching units including the slave neuron caching unit 306. For example, the slave data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 304 may be stored in an instruction queue within the slave data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 306 may be configured to store a column vector of the second matrix B.

The slave computation unit 302 may be configured to receive micro-instructions from the controller unit 106 and perform arithmetical logic operations according to the micro-instructions. For example, the slave computation unit 302 may include one or more multipliers 310, an adder 312, and an accumulator 314. The multipliers 310 may be configured to multiply the received row vector of the first matrix A with the stored column vector of the second matrix B. In some examples where bit lengths of the row vector and the column vector are greater than the bit length that the multipliers 310 may process, the multipliers 310 may be configured to divide the row vector and the column vector into segments and multiply the segments sequentially. A result of the multiplication between elements in the segments of the row vector and the column vector may be referred to as a multiplication result.

The adder 312 may be configured to add the multiplication results to generate an intermediate value. Multiple intermediate values corresponding to different segments of the row vector and the column vector may be accumulated by the accumulator 314 into a result element. The result element may be transmitted to the interconnection unit 108 for further processing.

In an example where the first matrix A and the second matrix B may be respectively described as $$\begin{bmatrix} a_{11} & a_{12} & \ldots & a_{1i} & \ldots & a_{1n} \\ a_{21} & a_{22} & \ldots & a_{2i} & \ldots & a_{2n} \\ \vdots & \vdots & \vdots & \vdots & \ddots & \vdots \\ a_{j1} & a_{j2} & \ldots & a_{ji} & \ldots & a_{jn} \\ \vdots & \vdots & \vdots & \vdots & & \vdots \\ a_{m1} & a_{m2} & \ldots & a_{mi} & \ldots & a_{mn} \end{bmatrix} \text{ and}$$

$$\begin{bmatrix} b_{11} & b_{12} & \ldots & b_{1i} & \ldots & b_{1p} \\ b_{21} & b_{22} & \ldots & b_{2i} & \ldots & b_{2p} \\ \vdots & \vdots & \vdots & \vdots & \ddots & \vdots \\ b_{j1} & b_{j2} & \ldots & b_{ji} & \ldots & b_{jp} \\ \vdots & \vdots & \vdots & \vdots & & \vdots \\ b_{n1} & b_{n2} & \ldots & b_{ni} & \ldots & b_{np} \end{bmatrix},$$

the slave computation module 114N may be configured to multiply the row vector $(a_{j1}, a_{j2}, \ldots a_{ji}, \ldots a_{jn})$ with the stored column vector $$\begin{pmatrix} b_{1i} \\ b_{2i} \\ \vdots \\ b_{ji} \\ \vdots \\ b_{ni} \end{pmatrix}.$$

When the bit length of the row vector is greater than a maximum bit length that the multipliers 310 can process, the multipliers 310 may be configured to divide the row vector and the column into segments and process the segments sequentially. For example, the multipliers 310 may be configured to calculate the multiplication between a segment of the row vector $(a_{j1}, a_{j2})$ with a segment of the column vector $$\begin{pmatrix} b_{1i} \\ b_{2i} \end{pmatrix}.$$

The multiplication results, e.g., $a_{j1} b_{1i}$ and $a_{j2}b_{2i}$, may be transmitted to and added by the adder 312 to generate an intermediate value, e.g., $a_{j1} b_{1i}+a_{j2}b_{2i}$. The multipliers 310 may then be configured to process other segments. The multiplication results may be similarly transmitted to and added by the adder 312. The intermediate values generated by the adder 312 with respect to the multiple segments may be further transmitted to the accumulator 314. The sum of the intermediate values by the accumulator 314 is the multiplication result of the row vector $(a_{j1}, a_{j2}, \ldots a_{ji}, a_{jn})$ and the stored column vector $$\begin{pmatrix} b_{1i} \\ b_{2i} \\ \vdots \\ b_{ji} \\ \vdots \\ b_{ni} \end{pmatrix}$$

and may be referred to as the result element.

Thus, with respect to a row vector of the first matrix A, one single slave computation module, e.g., 114N, may be configured to generate a result element. The result elements generated by the multiple slave computation modules 114 may be combined by the interconnection unit 108 into a row vector of the result matrix. The row vector of the result matrix may be transmitted to and stored by the master computation module 112.

In some example that the controller unit 106 receives a vector-multiply-matrix (WM) instruction, the first matrix A may only include one row vector. The above-described process may similarly apply. For example, the master computation module 112 may be configured to transmit the row vector of the first matrix A to the slave computation modules 114. The slave computation modules 114 may independently multiply the row vector of the first matrix A with the stored column vectors of the second matrix B.

Taking a slave computation module 114N as an example, the slave computation module 114N may be configured to multiply the row vector of the first matrix A with a column vector (e.g., the $n^{th}$ column vector) of the second matrix stored in the slave computation module 114N to generate a result element. Result elements from the multiple slave computation modules 114 may be transmitted to the interconnection unit 108. The interconnection unit 108 may be configured to combine the result elements into a result vector and transmit the result vector to the master computation module 112.

In some example that the controller unit 106 receives a matrix-multiply-vector (MMV) instruction, the second matrix B may only include one column vector. The above-described process may similarly apply. For example, the master computation module 112 may be further configured to respectively transmit column vectors of the second matrix B to one of the slave computation modules 114. In other words, only one slave computation module, e.g., 114N, may be configured to store the column vector of the second matrix B.

Taking a slave computation module 114N as an example, the slave computation module 114N may be configured to multiply the received row vector of the first matrix A with the only column vector of the second matrix stored in the slave computation module 114N to generate a result element. The result element may be transmitted to the master computation module 112. The master computation module 112 may transmit a next row vector of the first matrix A to the slave computation modules 114 for performing a similar multiplication operation. The sequentially generated result elements may be combined by the master computation module 112 into a result vector.

Figure 4:
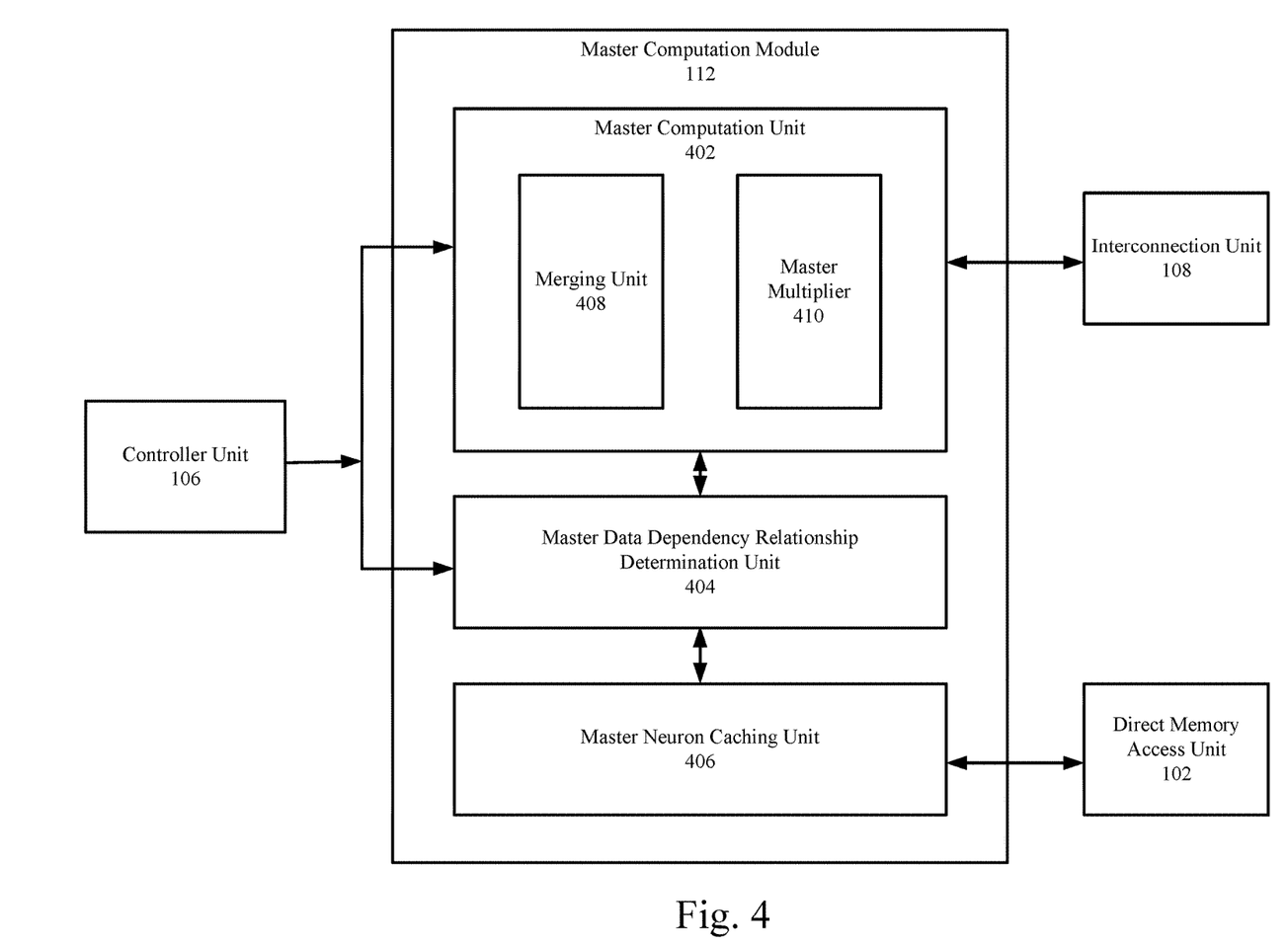
FIG. 4 is a block diagram illustrating an example master computation module by which matrix multiplication may be implemented in a neural network.

FIG. 4 is a block diagram illustrating an example master computation module 112 by which matrix multiplication may be implemented in a neural network. As shown in FIG. 4, the master computation module 162 comprises a master computation unit 402, a master data dependency relationship determination unit 404, and a master neuron caching unit 406. Similarly, a caching unit (e.g., the master neuron caching unit 406, the slave neuron caching unit 306, etc.) may refer to an on-chip caching unit integrated in the neural network acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory.

In some examples, the master data dependency relationship determination unit 404 may interface with the master computation unit 402 and the master neuron caching unit 406 and may be configured to prevent conflicts in reading and writing the data stored in the master neuron caching unit 406. For example, the master data dependency relationship determination unit 404 may be configured to determine whether there is a dependency relationship (i.e., a conflict) in terms of data between a micro-instruction which has not been executed and a micro-instruction being executed. If not, the micro-instruction may be allowed to be executed immediately; otherwise, the micro-instruction may not be allowed to be executed until all micro-instructions on which it depends have been executed completely. For example, all micro-instructions sent to the master data dependency relationship determination unit 404 may be stored in an instruction queue within the master data dependency relationship determination unit 404. In the instruction queue, if the target range of reading data by a reading instruction conflicts or overlaps with the target range of writing data by a writing instruction of higher priority in the queue, then a dependency relationship may be identified, and such reading instruction cannot be executed until the writing instruction is executed. Also, the master data dependency relationship determination unit 404 reads an input gradient vector from the master neuron caching unit 406 and then send the input gradient vector to the slave computation modules 114 through the interconnection unit 108. The output data from the slave computation modules 114 may be directly sent to the master computation unit 402 through the interconnection unit 108. Instructions output by the controller unit 106 are sent to the master computation unit 402 and the master data dependency relationship determination unit 404 to control the operations thereof.

In some examples, the master neuron caching unit 406 may be configured to store the first matrix A and row vectors returned from the interconnection unit 108.

The master computation unit 402 may further include a merging unit 408 and a master multiplier 410. The merging unit 408 may be configured to merge or combine the row vectors received from the interconnection unit 108 into the result matrix.

In some examples, the master computation module 112 may be configured to perform a multiplication operation between a matrix and a scalar value in response to a matrix-multiply-scalar (MMS) instruction. The MMS instruction may include an address of the matrix, a size of the matrix, and the scalar value. The master multiplier 410 may be configured to multiply each element in the matrix with the scalar value. For instance, the master multiplier 410 may include one or more multipliers configured to respectively calculate a multiplication between each element and the scalar value. The results of the multiplication may be transmitted to the merging unit 408. The merging unit 408 may be configured to merge or combine the results of the multiplication into an updated matrix.

Figure 5:
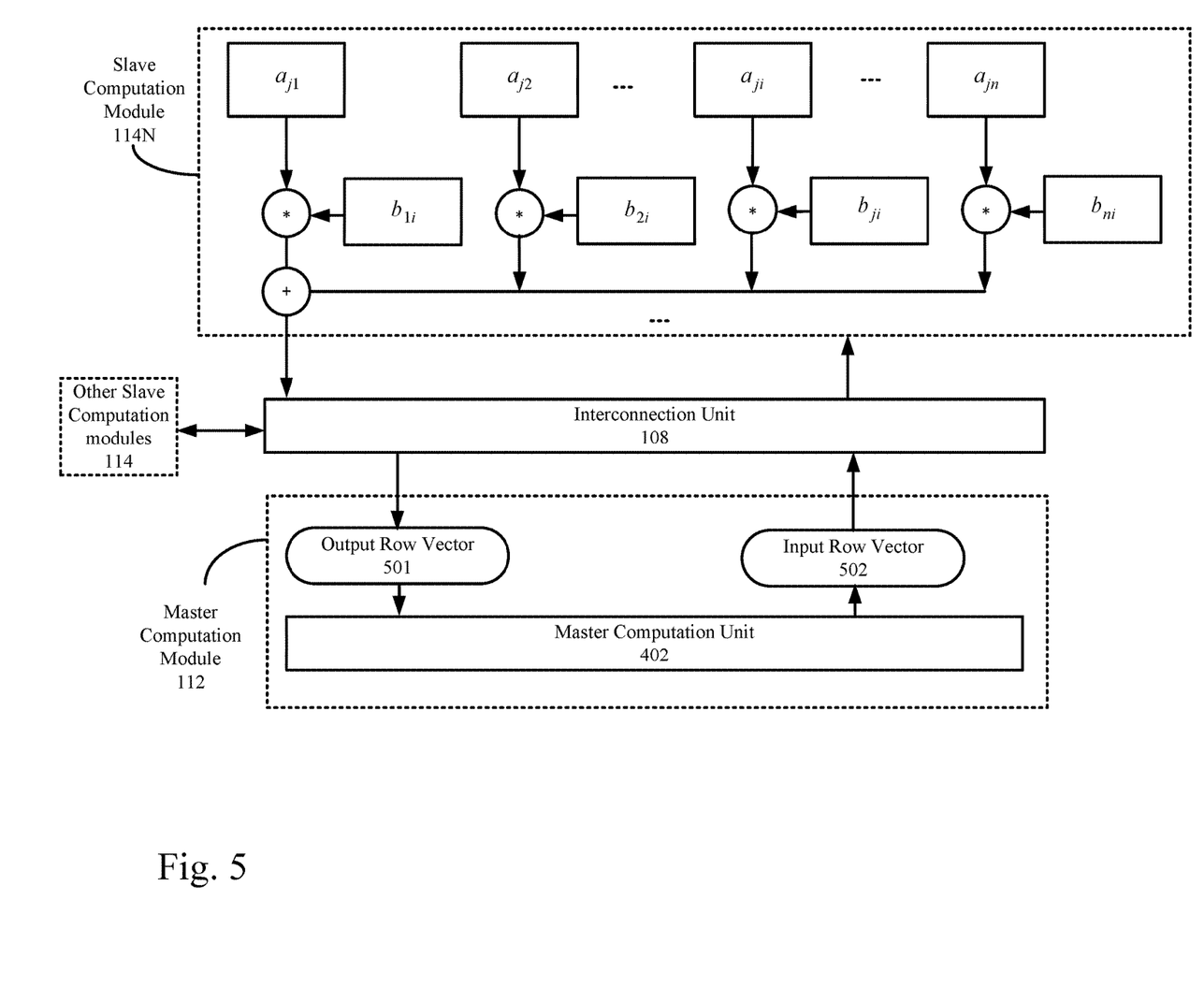
FIG. 5 is a block diagram illustrating an example matrix multiplication process in a neural network.

FIG. 5 is a block diagram illustrating an example matrix multiplication process in a neural network. As depicted, a row vector of the first matrix A (e.g., an input row vector 502) may be transmitted to the slave computation module 114N by the master computation unit 402 via the interconnection unit 108. The input row vector may be represented as $(a_{j1}, a_{j2}, \ldots a_{ji}, \ldots a_{jn})$. The slave computation module 114N may be configured to multiply the input row vector with a stored column vector of the second matrix B, e.g., $$\begin{pmatrix} b_{1i} \\ b_{2i} \\ \vdots \\ b_{ji} \\ \vdots \\ b_{ni} \end{pmatrix}.$$

As shown in FIG. 5, each element of the input row vector may be respectively multiplied with a corresponding element of the stored column vector. The multiplication results of the elements may be added together to generate a result element. Result elements generated by the multiple slave computation modules 114 may be transmitted to the interconnection unit 108. The interconnection unit 108 may be configured to combine the result elements to generate an output row vector 501. The output row vector 501 may be further transmitted to the master computation unit 402 and stored by the master neuron caching unit 406.

Figure 6:
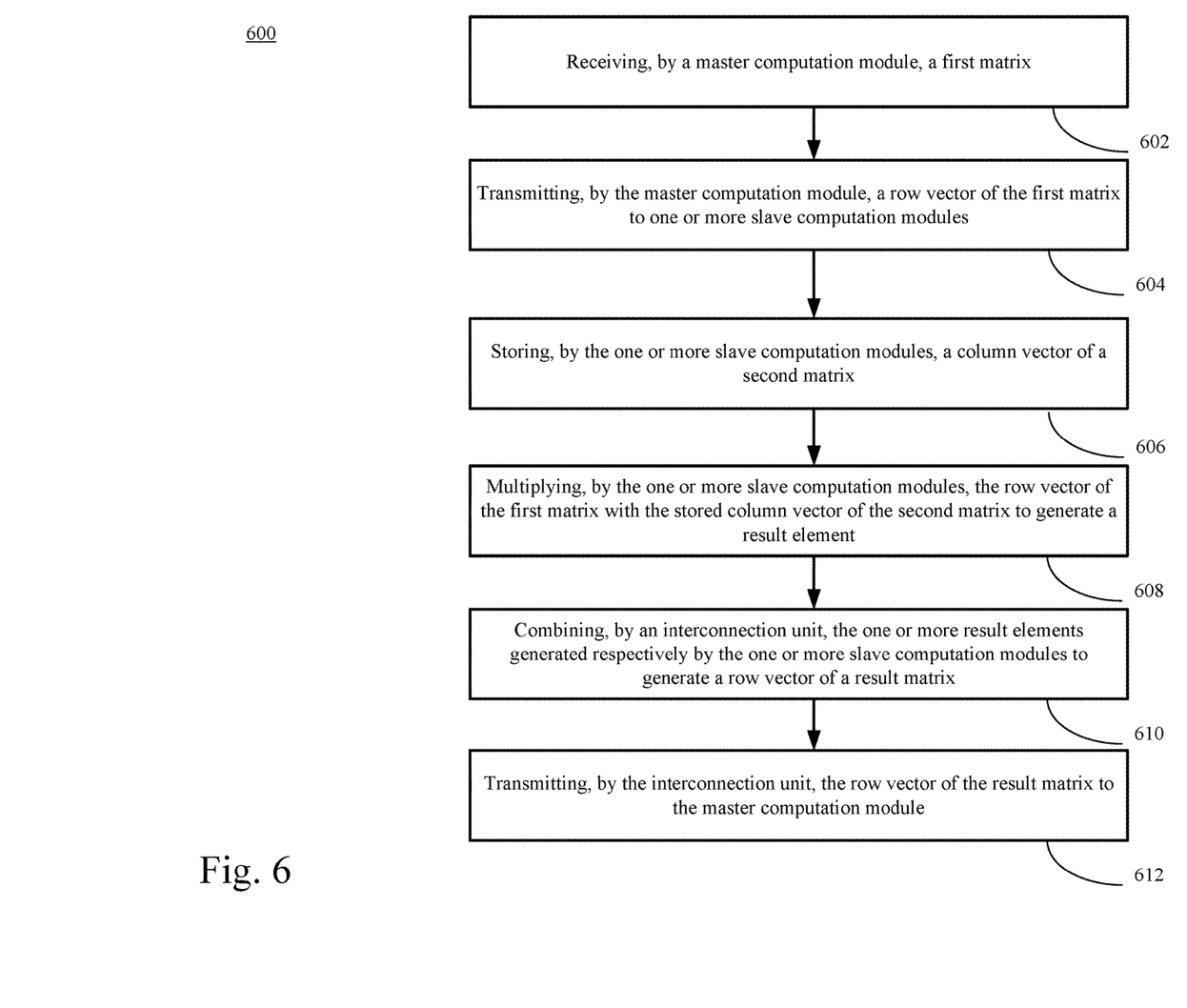
FIG. 6 is a flow chart of an example method for matrix multiplication in a neural network.

FIG. 6 is a flow chart of an example method 600 for matrix multiplication in a neural network according to embodiments of the present disclosure. The method may be performed by one or more components of the apparatus of FIGS. 1, 2, 3, and 4.

At block 602, the example method 600 may include receiving, by a master computation unit, a first matrix. For example, the direct memory access unit 102 may be configured to read the first matrix A and the second matrix B from the memory 101. The direct memory access unit 102 may be further configured to transmit the first matrix A and the second matrix B to the master computation module 112.

At block 604, the example method 600 may include transmitting, by the master computation module, a row vector of the first matrix to one or more slave computation modules. For example, the master computation module 112 may be configured to sequentially transmit each row vector of the first matrix A to the slave computation modules 114. Further, the master computation module 112 may be configured to transmit the column vectors of the second matrix B respectively to the slave computation modules 114.

At block 606, the example method 600 may include storing, by the one or more slave computation modules, a column vector of a second matrix. For example, each of the slave computation modules 114 may be configured to respectively store a column vector of the second matrix B.

At block 608, the example method 600 may include multiplying, by the one or more slave computation modules, the row vector of the first matrix with the stored column vector of the second matrix to generate a result element. For example, the slave computation modules 114 may independently multiply the row vector of the first matrix A with the stored column vectors of the second matrix B. Taking a slave computation module 114N as an example, the slave computation module 114N may be configured to multiply the received row vector of the first matrix A with a column vector (e.g., the n$^{th}$ column vector) of the second matrix stored in the slave computation module 114N to generate a result element.

At block 610, the example method 600 may include combining, by an interconnection unit, the one or more result elements generated respectively by the one or more slave computation modules to generate a row vector of a result matrix. For example, the result elements generated by the multiple slave computation modules 114 may be combined by the interconnection unit 108 into a row vector of the result matrix.

At block 612, the example method 600 may include transmitting, by the interconnection unit, the row vector of the result matrix to the master computation module. For example, the interconnection unit 108 may be configured to transmit the combined row vector of the result matrix to the master computation module 112. The master computation module 112 may be configured to merge or combine the row vectors received from the interconnection unit 108 into the result matrix.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for matrix multiplication in a neural network, comprising:
    a controller unit configured to receive a matrix-multiply-matrix (MM) instruction that includes a first starting address of a first matrix, a first size of the first matrix, a second starting address of a second matrix, and a second size of the second matrix;
    multiple computation modules configured to:
        receive the first matrix based on the first starting address and the first size of the first matrix,
        receive the second matrix based on the second starting address and the second size of the second matrix,
        respectively multiply, in response to the MM instruction, row vectors of the first matrix with column vectors of the second matrix to generate one or more result elements, and
    an interconnection unit configured to combine the result elements to generate one or more row vectors of a result matrix, wherein at least one of the multiple computation modules is configured to combine the row vectors to generate the result matrix,
    wherein the multiple computation modules include a master computation module configured to receive, in response to the MM instruction, the first matrix and transmit one of the row vectors of the first matrix to one or more slave computation modules,
    wherein the multiple computation modules include the one or more slave computation modules respectively configured to:
        store one of the column vectors of the second matrix,
        receive the one of the row vectors of the first matrix from the master computation module, and
        multiply the received row vector of the first matrix with the stored column vector of the second matrix to generate the result element.

2. The apparatus of claim 1,
    wherein the first size of the first matrix includes a count of first row vectors of the first matrix and a count of first column vectors of the first matrix, and
    wherein the second size of the second matrix includes a count of second row vectors of the second matrix and a count of the second column vectors of the second matrix.

3. The apparatus of claim 1, wherein the interconnection unit is further configured to transmit the generated row vectors of the result matrix to the master computation module.

4. The apparatus of claim 1, wherein each of the one or more slave computation modules includes:
    a slave neuron caching unit configured to store the column vector of the second matrix,
    one or more multipliers configured to respectively multiply one or more first elements in the row vector of the first matrix with one or more second elements in the stored column vector of the second matrix to generate one or more multiplication results, an adder configured to add the one or more multiplication results to generate an intermediate value of the row vector of the result matrix, and an accumulator configured to accumulate the one or more intermediate values to generate the result element.

5. The apparatus of claim 4, wherein each of the one or more multipliers is configured to perform a multiplication between one of the first elements and one of the second elements.

6. The apparatus of claim 1, wherein the first size of the first matrix indicates that the first matrix is a vector.

7. The apparatus of claim 1, wherein the second size of the second matrix indicates that the second matrix is a vector.

8. The apparatus of claim 1, wherein elements in the first matrix are equal to a scalar value included in the MM instruction.

9. A method for matrix multiplication in a neural network, comprising:

receiving, by a controller unit, a matrix-multiply-matrix (MM) instruction that includes a first starting address of a first matrix, a first size of the first matrix, a second starting address of a second matrix, and a second size of the second matrix;

receiving, by multiple computation modules, the first matrix based the first starting address and the first size of the first matrix, wherein the receiving the first matrix includes receiving, by a master computation module of the multiple computation modules, in response to the MM instruction, the first matrix and transmitting, by the master computation module, one of the row vectors of the first matrix to one or more slave computation modules;

receiving, by the multiple computation modules, the second matrix based on the second starting address and the second size of the second matrix;

respectively multiplying, in response to the MM instruction by the multiple computation modules, row vectors of the first matrix with column vectors of the second matrix to generate one or more result elements, wherein the multiplying includes:

respectively storing, by the one or more slave computation modules of the multiple computation modules, one of the column vectors of the second matrix, respectively receiving, by the one or more slave computation modules, the one of the row vectors of the first matrix from the master computation module, and respectively multiplying, by the one or more slave computation modules, the received row vector of the first matrix with the stored column vector of the second matrix to generate the result element;

combining, by an interconnection unit, the result elements to generate one or more row vectors of a result matrix; and combining, by at least one of the multiple computation modules, the row vectors to generate the result matrix.

10. The method of claim 9, wherein the first size of the first matrix includes a count of first row vectors of the first matrix and a count of first column vectors of the first matrix, and wherein the second size of the second matrix includes a count of second row vectors of the second matrix and a count of the second column vectors of the second matrix.

11. The method of claim 9, further comprising transmitting, by the interconnection unit, the generated row vectors of the result matrix to the master computation module.

12. The method of claim 9, further comprising:

storing, by a slave neuron caching unit of each of the one or more slave computation modules, the column vector of the second matrix;

respectively multiplying, by one or more multipliers of each of the one or more slave computation modules, one or more first elements in the row vector of the first matrix with one or more second elements in the stored column vector of the second matrix to generate one or more multiplication results;

adding, by an adder of each of the one or more slave computation modules, the one or more multiplication results to generate an intermediate value of the row vector of the result matrix; and accumulating, by an accumulator of each of the one or more slave computation modules, the one or more intermediate values to generate the result element.

13. The method of claim 12, further comprising performing, by each of the one or more multipliers, a multiplication between one of the first elements and one of the second elements.

14. The method of claim 9, wherein the first size of the first matrix indicates that the first matrix is a vector.

15. The method of claim 9, wherein the second size of the second matrix indicates that the second matrix is a vector.

16. The method of claim 9, wherein elements in the first matrix are equal to a scalar value included in the MINI instruction.

* * * * *